United States Patent
Chen

(10) Patent No.: US 9,122,124 B2
(45) Date of Patent: Sep. 1, 2015

(54) ACTUATOR AND CAMERA MODULE HAVING SAME

(71) Applicant: HON HAI PRECISION INDUSTRY CO., LTD., New Taipei (TW)

(72) Inventor: Yu-Han Chen, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 42 days.

(21) Appl. No.: 13/866,046

(22) Filed: Apr. 19, 2013

(65) Prior Publication Data

US 2014/0139729 A1    May 22, 2014

(30) Foreign Application Priority Data

Nov. 22, 2012   (TW) ............................... 101143656 A

(51) Int. Cl.
  G03B 3/00     (2006.01)
  F03G 7/06     (2006.01)
  H04N 5/225    (2006.01)

(52) U.S. Cl.
  CPC  *G03B 3/00* (2013.01); *F03G 7/065* (2013.01); *H04N 5/2257* (2013.01); *Y10T 74/18992* (2015.01)

(58) Field of Classification Search
  None
  See application file for complete search history.

(56) References Cited

U.S. PATENT DOCUMENTS

| 8,433,188 | B2* | 4/2013 | Wu .............................. 396/133 |
| 2009/0295986 | A1* | 12/2009 | Topliss et al. ................. 348/374 |
| 2011/0179786 | A1* | 7/2011 | Topliss et al. .................. 60/527 |
| 2012/0139401 | A1* | 6/2012 | Huang et al. ............... 312/319.2 |

* cited by examiner

*Primary Examiner* — Roberto Velez
*Assistant Examiner* — Yih-Sien Kao
(74) *Attorney, Agent, or Firm* — Novak Druce Connolly Bove + Quigg LLP

(57) ABSTRACT

An actuator includes a base, a stationary frame mounted on the base, a moveable frame supported on the base, and a driving unit. The stationary frame includes a receiving cavity, a first sidewall, a neighboring second sidewall, an upper end, and an opposing lower end. The stationary frame defines a first cutout in the first sidewall, a second cutout in the second sidewall, and a third cutout passing through the lower end. The first cutout and the second cutout communicate with the receiving cavity, and the third cutout is located between the first cutout and the second cutout and directly communicates with the first cutout and the second cutout. The moveable frame includes a main body received in the receiving cavity and a protruding portion received in the third cutout. The driving unit includes a guide pole, a first metal clip, a second metal clip, and a SMA wire.

20 Claims, 3 Drawing Sheets

ACTUATOR AND CAMERA MODULE HAVING SAME

BACKGROUND

1. Technical Field

The present disclosure relates to an actuator and a camera module having the actuator.

2. Description of Related Art

With ongoing developments in microcircuitry and multimedia technology, camera modules have become widely used in a variety of consumer electronic devices, such as cell phones, notebook computers, digital cameras, and personal digital assistants, for example. A camera module includes a lens module and an image sensor. In addition, there is a growing demand for developing more camera modules with multiple functions, such as camera modules having actuators with an auto-focus function.

One type of actuator is a step motor, which is used to move the lens module along an optical axis in a camera module to achieve the auto-focus function. However, the step motor needs many transmission mechanisms, such as a driving gear and a number of slave gears to convert rotational movement of the lens module into linear movement along the optical axis. These components take up much space, thus adding to the size of the camera module.

Therefore, it is desirable to provide an actuator and a camera module having the actuator, which can overcome or at least alleviate the limitations described.

DETAILED DESCRIPTION

Figure 1:
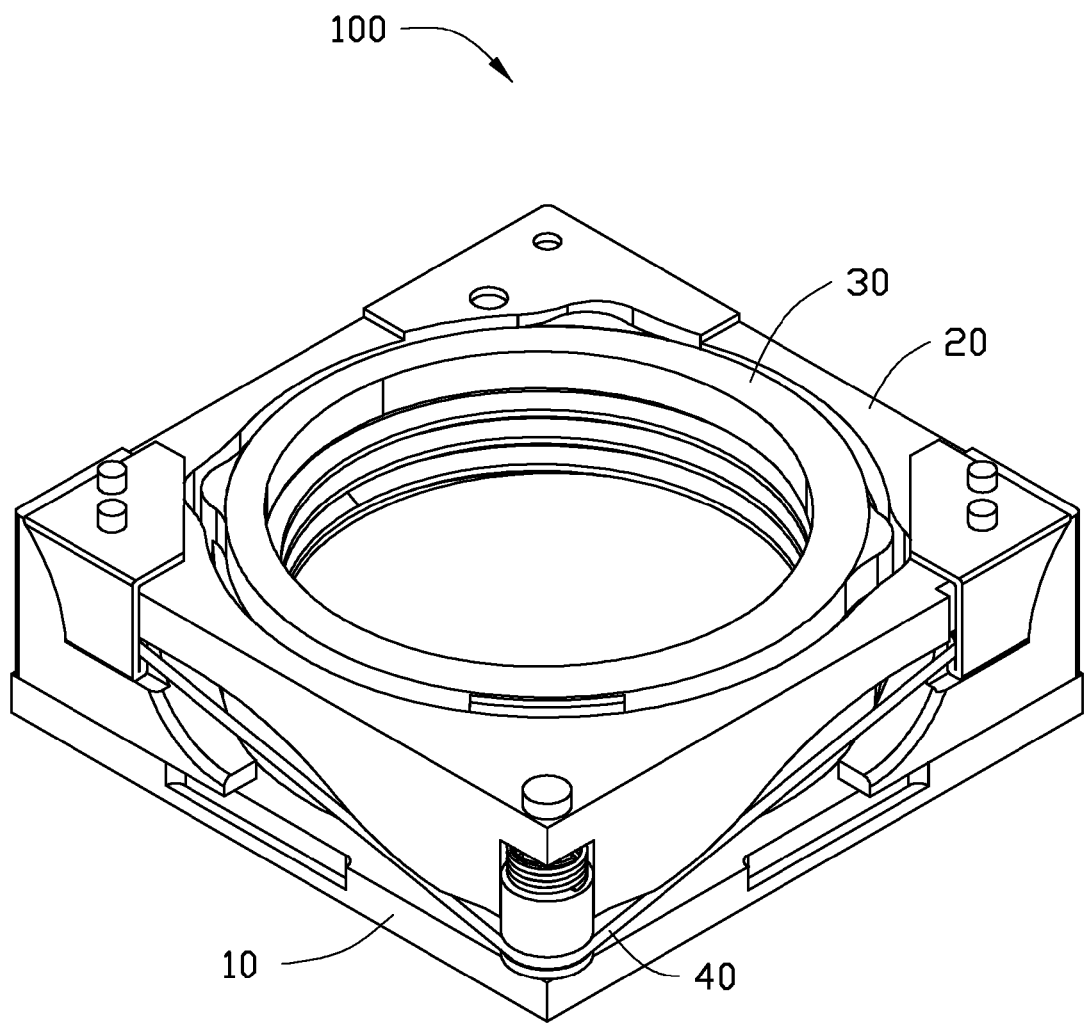
FIG. 1 is a schematic, isometric view of an actuator, according to a first exemplary embodiment.

FIG. 1 is an actuator 100 according to a first exemplary embodiment. The actuator 100 includes a base 10, a stationary frame 20, a moveable frame 30, and a driving unit 40.

Figure 2:
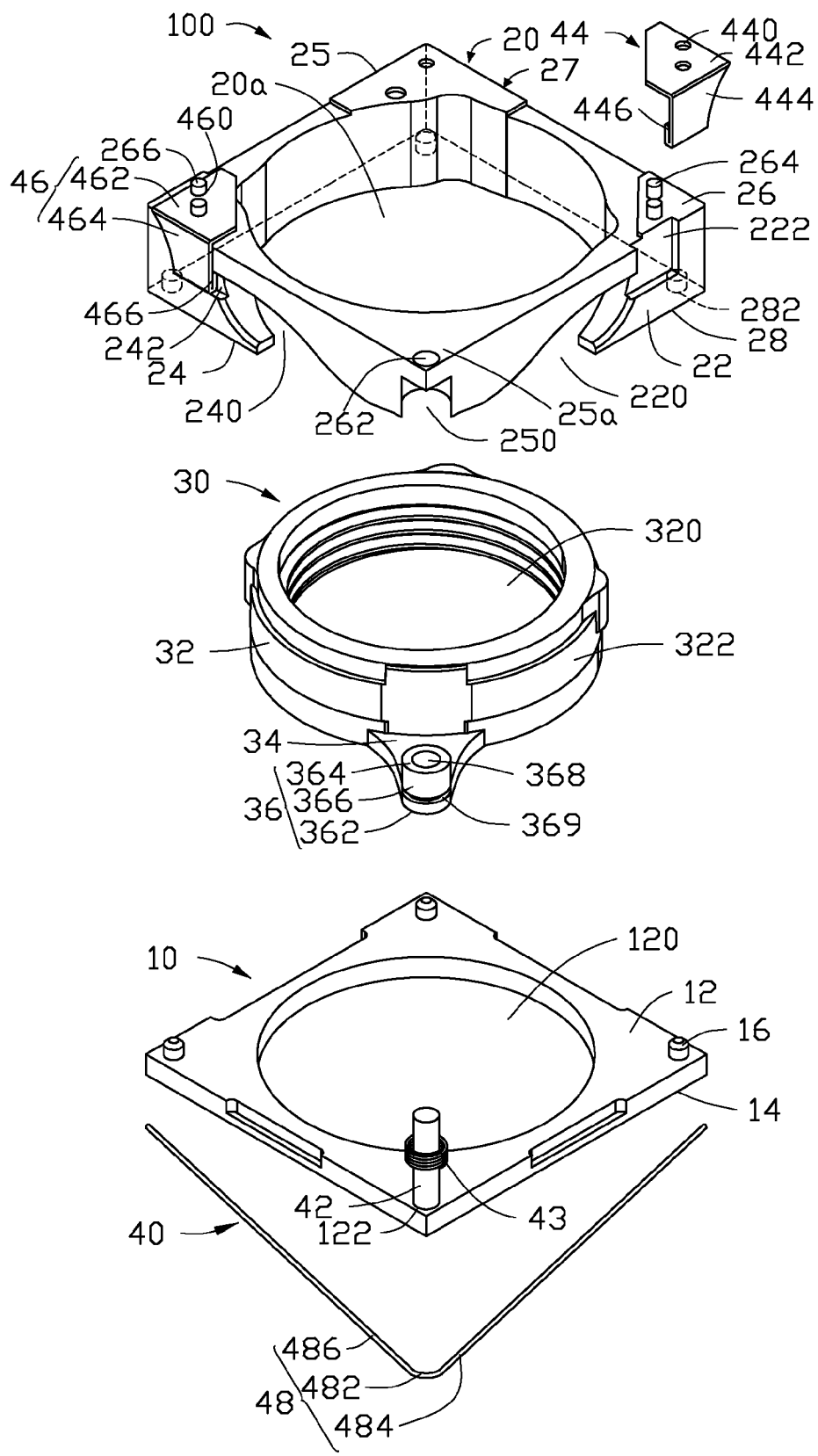
FIG. 2 is an exploded view of the actuator of FIG. 1.

FIG. 2 shows that the base 10 is substantially a rectangular plate and includes a first surface 12 and a second surface 14. The first surface 12 and the second surface 14 are located at opposite sides of the base 10, and the first surface 12 is parallel to the second surface 14. The base 10 defines a circular aperture 120 and a fixing hole 122. The aperture 120 is positioned at a central portion of the base 10, and extends from the first surface 12 to the second surface 14. The fixing hole 122 is positioned at one of corners of the first surface 12 and apart from the aperture 120. The fixing hole 122 passes through the first surface 12, but does not reach the second surface 14. That is, the fixing hole 122 is a blind hole in this embodiment. In alternative embodiments, the fixing hole 122 may be a through hole, which passes through the first surface 12 and the second surface 14. Three protrusions 16 perpendicularly extend from other three corners of the first surface 12.

The stationary frame 20 is substantially cuboid, and may be fixed to an electronic device, such a cell phone (not shown). The stationary frame 20 includes a first sidewall 22, a second sidewall 24, a third sidewall 25, a fourth sidewall 27, an upper end 26, and a lower end 28.

The first sidewall 22, the second sidewall 24, the third sidewall 25, and the fourth sidewall 27 perpendicularly connect each other end-to-end to form a receiving cavity 20a. In detail, the first sidewall 22 and the third sidewall 25 are positioned at opposite sides of the stationary frame 20, and the first sidewall 22 is parallel to the third sidewall 25. The second sidewall 24 and the fourth sidewall 27 are positioned at opposite sides of the stationary frame 20, and the second sidewall 24 is parallel to the fourth sidewall 27. The first sidewall 22 and the second sidewall 24 intersect at a joint 25a.

The first sidewall 22 defines a first cutout 220 and a first groove 222. The first cutout 220 passes through the first sidewall 22. The first groove 222 does not pass through the first sidewall 22. That is, the first cutout 220 directly communicates with the receiving cavity 20a, and the first groove 222 does not directly communicate with the receiving cavity 20a. In this embodiment, the first groove 222 is in communication with the receiving cavity 20a through the first cutout 220.

The second sidewall 24 defines a second cutout 240 and a second groove 242. The second cutout 240 passes through the second sidewall 24. The second groove 242 does not pass through the second sidewall 24. That is, the second cutout 240 directly communicates with the receiving cavity 20a, and the second groove 242 does not directly communicate with the receiving cavity 20a. In this embodiment, the second groove 242 is in communication with the receiving cavity 20a through the second cutout 240.

A third cutout 250 is defined in the joint 25a. The third cutout 250 passes through the first sidewall 22 and the second sidewall 24 and is located between the first cutout 220 and the second cutout 240. In this embodiment, the third cutout 250 directly communicates with the first cutout 220 and the second cutout 240.

The upper end 26 and the lower end 28 are positioned opposite sides of the stationary frame 20. The upper end 26 defines a passing hole 262. The passing hole 262 is located at the joint 25a and communicates with the third cutout 250. Two first engagement posts 264 perpendicularly extend from the upper end 26 and correspond to the first groove 222. Two second engagement posts 266 perpendicularly extend from the upper end 26 and correspond to the second groove 242. The lower end 28 defines three blind holes 282 corresponding to the three protrusions 16. The protrusions 16 engage in the respective blind holes 282 so that the stationary frame 20 is securely mounted on the base 10.

The moveable frame 30 includes a main body 32, an extending portion 34, and a protruding portion 36. The main body 32 is substantially a hollow cylinder and defines a receiving room 320 for receiving a lens module 50 (shown in FIG. 3). The main body 32 is received in the receiving cavity 20a and supported on the first surface 12. The main body 32 includes a circumferential surface 322 surrounding the receiving room 320. The extending portion 34 extends from the circumferential surface 322 away the receiving room 320. In this embodiment, the extending portion 34 is substantially a planar plate. The protruding portion 36 is substantially a cylinder and connected to the extending portion 34. The protruding portion 36 and the main body 32 are positioned at opposite sides of the extending portion 34. In detail, the protruding portion 36 includes a lower surface 362, an upper surface 364, and an outer surface 366 and defines a through hole 368 extending the upper surface 364 to the lower surface 362. The lower surface 362 and the upper surface 364 are positioned at opposite sides of the protruding portion 36, and the lower surface 362 is parallel to the upper surface 364. The outer surface 366 is interconnected between the lower surface 362 and the upper surface 364. The lower surface 362 and the extending portion 34 are supported on the first surface 12. The upper surface 364 is spaced apart from the upper end 26. The outer surface 366 defines an annular recess 369.

The driving unit 40 includes a guide pole 42, a resilient portion 43, a first metal clip 44, a second metal clip 46, and a shape memory alloy (SMA) wire 48.

One end of the guide pole 42 engages in the fixing hole 122, and the other end of the guide pole 42 passes the through hole 368 and the passing hole 262. In this embodiment, the guide pole 42 is made of stainless steel.

The resilient portion 43 sleeves on the guide pole 42. Opposite ends of the resilient portion 43 abut the upper end 26 and the upper surface 364 respectively. In this embodiment, the resilient portion 43 is a spring.

The first metal clip 44 is made of conductive material and includes a first connection portion 442 and a first clipping portion 444. The first connection portion 442 defines two first engagement holes 440 corresponding to the first engagement posts 264. The first clipping portion 444 perpendicularly extends from the first connection portion 442 and includes a first clipping groove 446. The first engagement posts 264 engage in the corresponding first engagement holes 440 so that the first connection portion 442 is fixedly mounted on the upper end 26, and the first clipping portion 444 is received in the first groove 222. The first connection portion 422 is also soldered to an external circuit board to feed current into the first metal clip 44. It is understood that the first connection portion 422 may be fixedly mounted on the upper end 26 by soldering or using glue.

The second metal clip 46 is made of conductive material and has a structure the same as the first metal clip 44. In detail, the second metal clip 46 includes a second connection portion 462 and a second clipping portion 464. The second connection portion 462 defines two second engagement holes 460 corresponding to the second engagement posts 266. The second clipping portion 464 perpendicularly extends from the second connection portion 462 and includes a second clipping groove 466. The second engagement posts 266 engage in the corresponding second engagement holes 460 so that the second connection portion 462 is fixedly mounted on the upper end 26, and the second clipping portion 464 is received in the second groove 242. The second connection portion 462 is also soldered to an external circuit board to feed current into the second metal clip 46. The second connection portion 462 may be fixedly mounted on the upper end 26 by soldering or using glue.

Opposite ends of the SMA wire 48 are clipped in the first clipping groove 446 and the second clipping groove 466. In detail, the SMA wire 48 includes a first linear portion 484, a second linear portion 486, and a bent portion 482 arranged between the first linear portion 484 and the second linear portion 486. The first linear portion 484 is received in the first cutout 220, and does not contact the upper end 26 and the lower end 28. The second linear portion 486 is received in the second cutout 240, and does not contact the upper end 26 and the lower end 28. The bent portion 482 is received in the annular groove 369, and contacts and hooks the protruding portion 36. In this embodiment, the bent portion 482 is entirely received in the third cutout 250.

When the actuator 100 is assembled, first, one end of the guide pole 42 engages in the fixing hole 122 so that the guide pole 42 is mounted on the base. Second, the moveable frame 30 is supported on the first surface 12, and the guide pole 42 passes through the through hole 368. Third, the resilient portion 43 sleeves on the guide pole 42, and one end of the resilient portion 43 abuts the upper surface 364. Fourth, the protrusions 16 engage in the respective blind holes 282 so that the stationary frame 20 is mounted on the base. The guide pole 42 passes the passing hole 262, and the other end of the resilient portion 43 abuts the upper end 26. In this situation, the main body 32 is received in the receiving cavity 20a and is supported on the first surface 12. The extending portion 34 and the protruding portion 36 are supported on the first surface 12, and the protruding portion 36 is received in the third cutout 250. Fifth, opposite ends of the SMA wire 48 are clipped in the first clipping groove 446 and the second clipping groove 466. The first linear portion 484 is received in the first cutout 220, and does not contact the upper end 26 and the lower end 28. The second linear portion 486 is received in the second cutout 240, and does not contact the upper end 26 and the lower end 28. The bent portion 482 is received in the annular groove 369, and contacts and hooks the protruding portion 36.

When in use, if a current from the external circuit board is applied to the SMA wire 48 through the first metal clip 44 and the second metal clip 46, the SMA wire 48 is heated and contracted. The contracted SMA wire 48 drives the moveable frame 30 together with the lens module 50 to move upward (away from the first surface 12) along the guide pole 42 to achieve an auto-focus function. When the moveable frame 30 moves upward along the guide pole 42, the resilient portion 43 is compressed. If the current is cut, the SMA wire 48 is cooled and extended, the resilient portion 43 restores, and the moveable frame 30 together with the lens module 50 is driven to an initial position by the resilient portion 43.

The driving unit 40 and the moveable frame 30 cooperatively achieve an auto-focus function of the lens module 50, avoiding the need for many transmission mechanisms. Accordingly, the size of the actuator 100 can be substantially reduced. Furthermore, the size of the actuator 100 can be further reduced if the first linear portion 484 is received in the first cutout 220, the second linear portion 486 is received in the second cutout 240, and the bent portion 482 is received in the third cutout 250. Neither the first linear portion 484 or the second linear portion 486 make contact with the upper end 26 and the lower end 28, reducing friction and increasing the life span of the SMA wire 48. In addition, an included angle between the first linear portion 484 and the second linear portion 486 is defined if the bent portion 482 is received in the third cutout 250 and is larger than the included angle between the first linear portion 484 and the second linear portion 486 if the bent portion 482 is positioned outside of the third cutout 250. Thus, a stress concentration on the protruding portion 36 of the SMA wire 48 can be reduced. Therefore, the life span of the SMA wire 48 can be further increased.

Figure 3:
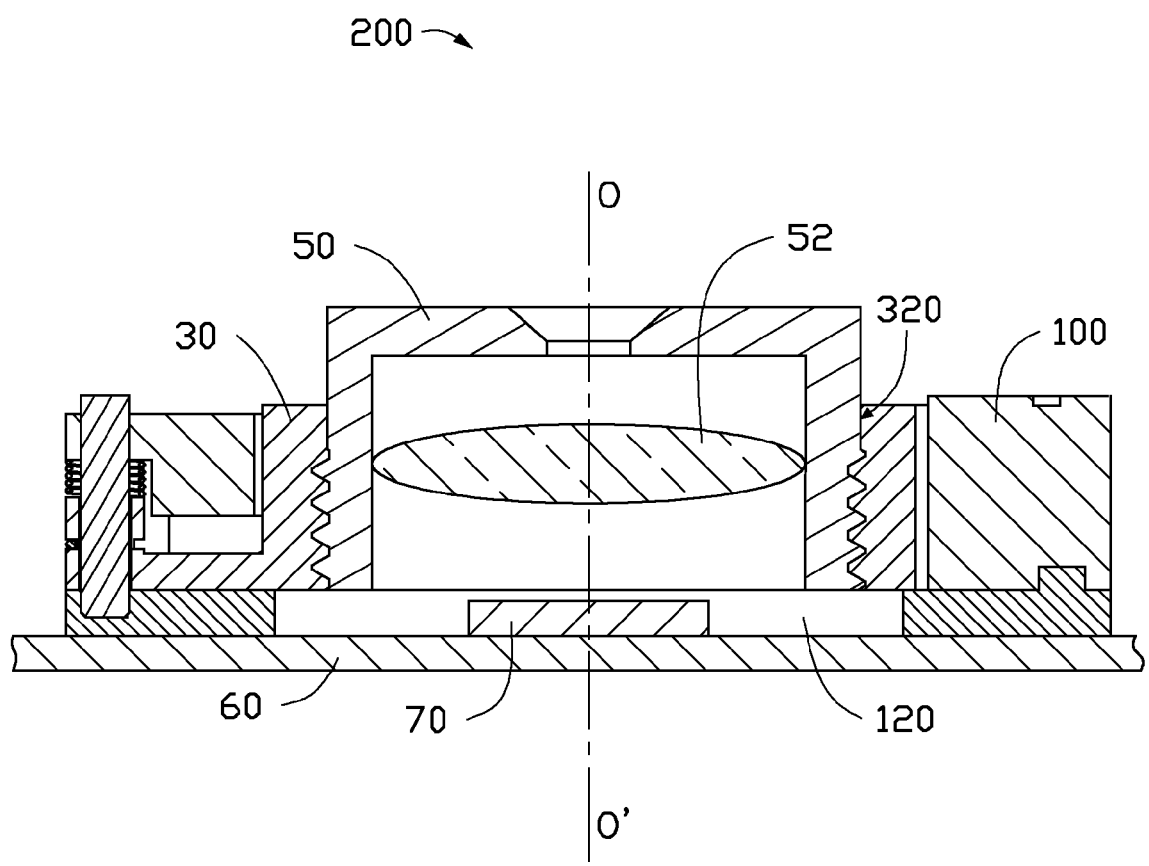
FIG. 3 is a sectional view of a camera module, according to a second exemplary embodiment.

FIG. 3 shows a camera module 200 according to a second exemplary embodiment. The camera module 200 includes the actuator 100, a lens module 50, a substrate 60, and an image sensor 70. The lens module 50 is received in the receiving room 320 and includes at least one lens 52. The actuator 100 is supported on the substrate 60. The image sensor 70 is positioned on the substrate 60 and is received in the aperture 120. The optical axis OO' of the lens module 50 is aligned with a center of the image sensor 70 and the center of the aperture 120. In use of the camera module 200, the moveable frame 30 together with the lens module 50 moves along the guide pole 42 to achieve an auto-focus function.

The advantages of the camera module 200 of the second embodiment are similar to those of the actuator 100 of the first embodiment.

Even though numerous characteristics and advantages of the present embodiments have been set fourth in the foregoing description, together with details of the structures and functions of the embodiments, the disclosure is illustrative only, and changes may be made in details, especially in the matters of shape, size, and arrangement of parts within the principles of the disclosure to the full extent indicated by the broad general meaning of the terms in which the appended claims are expressed.

What is claimed is:

1. An actuator comprising:
   a base;
   a stationary frame fixedly mounted on the base, the stationary frame comprising a receiving cavity, a first sidewall, a neighboring second sidewall, an upper end, and a lower end opposite to the upper end, the stationary frame defining a first cutout in the first sidewall, a second cutout in the second sidewall, and a third cutout passing through the lower end, the first cutout and the second cutout communicating with the receiving cavity, the third cutout located between the first cutout and the second cutout and directly communicating with the first cutout and the second cutout;
   a moveable frame supported on the base, the moveable frame comprising a main body, an extending portion extending from a circumferential surface of the main body, and a protruding portion extending from and connected to the extending portion, the main body received in the receiving cavity, the protruding porton received in the third cutout and being spaced apart from the stationary frame, the protruding portion comprising a lower surface, an upper surface opposite to the lower surface, an outer surface interconnected between the lower surface and the upper surface, and a through hole passing through the upper surface and the lower surface, the lower surface and the extending portion contacting the base, the upper surface being apart from the upper end, an annular groove defined in the outer surface; and
   a driving unit comprising a guide pole, a first metal clip, a second metal clip, and a shape memory alloy (SMA) wire, the guide pole fixed on the base and passing through the protruding portion and the stationary frame, the first metal clip mounted on the first sidewall, the second metal clip mounted on the second sidewall, opposite ends of the SMA wire respectively clipped to the first metal clip and the second metal clip, the SMA wire comprising a first linear portion, second linear portion, and a bent portion between the first linear portion and the second linear portion, the first linear portion received in the first cutout, the second linear portion received in the second cutout, and the bent portion received in the annular groove and contacting the protruding portion.

2. The actuator as claimed in claim 1, wherein the first cutout passes through the lower end.

3. The actuator as claimed in claim 1, wherein the second cutout passes through the lower end.

4. The actuator as claimed in claim 1, wherein the first sidewall and the second sidewall intersect at a joint, and the third cutout is located at the joint.

5. The actuator as claimed in claim 1, wherein the upper end defines a passing hole, and the guide pole passes through the through hole and the passing hole.

6. The actuator as claimed in claim 5, wherein the driving unit further comprises a resilient portion, the resilient portion sleeves on the guide pole, and two ends of the resilient portion abut the upper surface and the upper end respectively.

7. The actuator as claimed in claim 1, wherein the first sidewall defines a first groove communicating with the first cutout, the first metal clip comprises a first connection portion and a first clipping portion perpendicularly extending from the first connection portion, the first connection portion is fixedly mounted on the upper end, the first clipping portion is received in the first groove, the second sidewall defines a second groove communicating with the second cutout, the second metal clip comprise a second connection portion and a second clipping portion perpendicularly extending from the second connection portion, the second connection portion is fixedly mounted on the upper end, and the second clipping portion is received in the second groove.

8. The actuator as claimed in claim 7, wherein two first engagement post perpendicularly extend from the upper end and correspond to the first groove, the first connection portion defines two first engagement holes corresponding to the first engagement posts, and the first engagement posts engage in the corresponding first engagement holes so that the first connection portion is fixedly mounted on the upper end.

9. The actuator as claimed in claim 7, wherein two second engagement posts perpendicularly extend from the upper end and correspond to the second groove, the second connection portion defines two second engagement holes corresponding to the second engagement posts, and the second engagement posts engage in the corresponding second engagement holes so that the second connection portion is fixedly mounted on the upper end.

10. The actuator as claimed in claim 1, wherein the extending portion is substantially a planar plate, the protruding portion is substantially a cylinder, and the protruding portion and the main body are positioned at opposite sides of the extending portion.

11. A camera module comprising:
    an actuator comprising:
       a base;
       a stationary frame fixedly mounted on the base, the stationary frame comprising a receiving cavity, a first sidewall, a neighboring second sidewall, an upper end, and a lower end, opposite to the upper end, the stationary frame defining a first cutout in the first sidewall, a second cutout in the second sidewall, and a third cutout passing through the lower end, the first cutout and the second cutout communicating with the receiving cavity, the third cutout located between the first cutout and the second cutout and directly communicating with the first cutout and the second cutout;
       a moveable frame supported on the base, the moveable frame comprising a main body, an extending portion extending from a circumferential surface of the main body, and a protruding portion, extending from and connected to the extending portion, the main body received in the receiving cavity, the protruding portion received in the third cutout and being spaced apart from the stationary frame, the protruding portion comprising a lower surface, an upper surface opposite to the lower surface, an outer surface interconnected between the lower surface and the upper surface, and a through hole passing through the upper surface and the lower surface, the lower surface and the extending portion contacting the base, the upper surface being apart from the upper end, an annular groove defined in the outer surface; and
       a driving unit comprising a guide pole, a first metal clip, a second metal clip, and a shape memory alloy (SMA) wire, the guide pole fixed on the base and passing through the protruding portion and the stationary frame, the first metal clip mounted on the first sidewall, the second metal clip mounted on the second sidewall, opposite ends of the SMA wire respectively clipped to the first metal clip and the second metal clip, the SMA wire comprising a first linear portion, a second linear portion, and a bent portion between the first linear portion and the second linear portion, the first linear portion received in the first cutout, the second linear portion received in the second cutout, and the bent portion received in the annular groove and contacting the protruding portion;

a lens module received in the moveable frame;

a substrate supporting the actuator; and an image sensor received in the base and supported by the substrate, and an optical axis of the lens module aligned with a center of the image sensor.

12. The camera module as claimed in claim 11, wherein the first cutout passes through the lower end.

13. The camera module as claimed in claim 11, wherein the second cutout passes through the lower end.

14. The camera module as claimed in claim 11, wherein the first sidewall and the second sidewall intersect at a joint, and the third cutout is located at the joint.

15. The camera module as claimed in claim 11, wherein the upper end defines a passing hole, and the guide pole passes through the through hole and the passing hole.

16. The camera module as claimed in claim 15, wherein the driving unit further comprises a resilient portion, the resilient portion sleeves on the guide pole, and two ends of the resilient portion abut the upper surface and the upper end respectively.

17. The camera module as claimed in claim 11, wherein the first sidewall defines a first groove communicating with the first cutout, the first metal clip comprises a first connection portion and a first clipping portion perpendicularly extending from the first connection portion, the first connection portion is fixedly mounted on the upper end, the first clipping portion is received in the first groove, the second sidewall defines a second groove communicating with the second cutout, the second metal clip comprise a second connection portion and a second clipping portion perpendicularly extending from the second connection portion, the second connection portion is fixedly mounted on the upper end, and the second clipping portion is received in the second groove.

18. The camera as claimed in claim 17, wherein two first engagement posts perpendicularly extend from the upper end and correspond to the first groove, the first connection portion defines two first engagement holes corresponding to the first engagement posts, and the first engagement posts engage in the corresponding first engagement holes so that the first connection portion is fixedly mounted on the upper end.

19. The camera module as claimed in claim 17, wherein two second engagement posts perpendicularly extend from the upper end and correspond to the second groove, the second connection portion defines two second engagement holes corresponding to the second engagement posts, and the second engagement posts engage in the corresponding second engagement holes so that the second connection portion is fixedly mounted on the upper end.

20. The camera module as claimed in claim 11, wherein the extending portion is substantially a planar plate, the protruding portion is substantially a cylinder, and the protruding portion and the maim body are positioned at opposite sides of the extending portion.

* * * * *